April 7, 1970   L. S. HUSTON, JR   3,505,050
METHOD OF MAKING A GLASS TO GLASS SEAL
Filed March 20, 1967   2 Sheets-Sheet 1

LEROY S. HUSTON, JR
INVENTOR

BY Lawrence Burns
ATTORNEY

April 7, 1970    L. S. HUSTON, JR    3,505,050
METHOD OF MAKING A GLASS TO GLASS SEAL
Filed March 20, 1967    2 Sheets-Sheet 2

LEROY S. HUSTON, JR.
INVENTOR

BY *Lawrence Burns*
ATTORNEY

United States Patent Office 3,505,050
Patented Apr. 7, 1970

3,505,050
METHOD OF MAKING A GLASS TO GLASS SEAL
Leroy S. Huston, Jr., Marblehead, Mass., assignor to Sylvania Electric Products Inc., a corporation of Delaware
Filed Mar. 20, 1967, Ser. No. 624,569
Int. Cl. C03b 5/16, 29/00
U.S. Cl. 65—34                                    10 Claims

ABSTRACT OF THE DISCLOSURE

In the fabrication of a lamp, a carbon ring is disposed around the exhaust tube of a pressurized lamp envelope and inductively heated. The encircled portion of the exhaust tube becomes softened thereby and is then sealed within the carbon ring by the application of a compressive force to form a lamp.

BACKGROUND OF THE INVENTION

Field of the invention

This invention pertains to electric lamps and the like and their manufacture. It particularly relates to lamps which are gas-filled to an internal pressure sufficiently high that standard sealing processes which are dependent on a partial vacuum within the lamp at ambient conditions are not applicable.

Description of the prior art

In the sealing of lamps which, at ambient conditions, have an internal pressure of about one atmosphere or greater, it is known to subject the lamp to a low temperature whereby the fill gas is condensed to a liquid and the internal pressure is consequently reduced below one atmosphere. The lamp is sealed by applying heat to and softening the exhaust tube. As a result of the partial vacuum within the lamp, the external atmosphere contracts the softened portion of the exhaust tube, resulting in a hermetic seal. The sealing operation must be completed before sufficient condensate has vaporized to raise the internal pressure of the lamp to about one atmosphere or more. An example is a lamp filled with argon gas to an internal pressure of one atmosphere. Immersion of this lamp, after filling, into liquid nitrogen at a temperature of about 77 degrees Kelvin condenses the argon gas into a liquid, since it liffuefies at about 87 degrees Kelvin. This results in a partial vacuum within the lamp. The lamp is then sealed while sufficient argon remains liquefied to maintain the partial vacuum.

This process is expensive since considerable quantities of liquid nitrogen are consumed in cooling the lamps to the low temperature of 77 degrees Kelvin. The equipment also is bulky and requires extensive insulation to reduce loss by vaporization of the liquid nitrogen, which is exposed to an environment about 200 degrees Kelvin higher.

SUMMARY

This invention is concerned with a new process for manufacturing a lamp whose fill pressure is too high to use conventional sealing pressures, which are dependent on a partial vacuum within the lamp at ambient conditions. It has been discovered that when a susceptor, such as a carbon ring is disposed about the vitreous exhaust tube of such a lamp it can be sealed with an internal fill pressure greater than one atmosphere. The susceptor is inductively heated until the encircled portion of the exhaust tube is softened. An external force applied to the lamp puts the softened portion in compression, sealing the exhaust tube while the susceptor restricts the radial flow of the material.

This invention eliminates the costly process of reducing the internal pressure of a pressurized lamp below one atmosphere in order to form a seal.

DESCRIPTION OF THE PREFERRED EMBODIMENT

Figure 1:
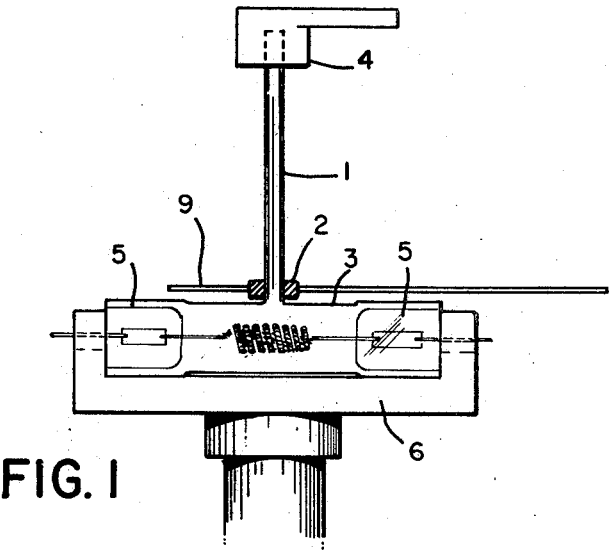
FIGURE 1 is an elevational view, partly in section, of a lamp in the first step of the process.
Figure 2:
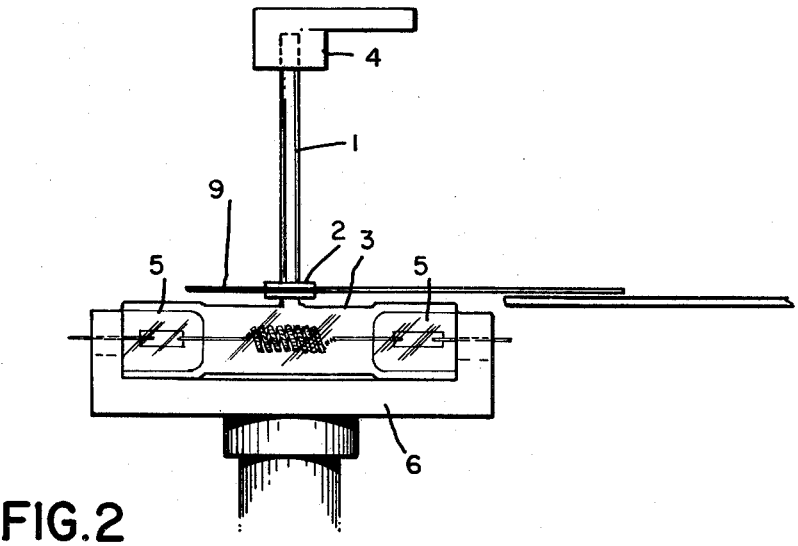
FIGURE 2 is an elevational view illustrating the inductive heating means.

In FIGURE 1, a lamp with vitreous exhaust tube 1 attached is shown. A susceptor 2 generally in the form of a carbon ring is disposed around exhaust tube 1 and is adjacent to lamp envelope 3.

Figure 3:
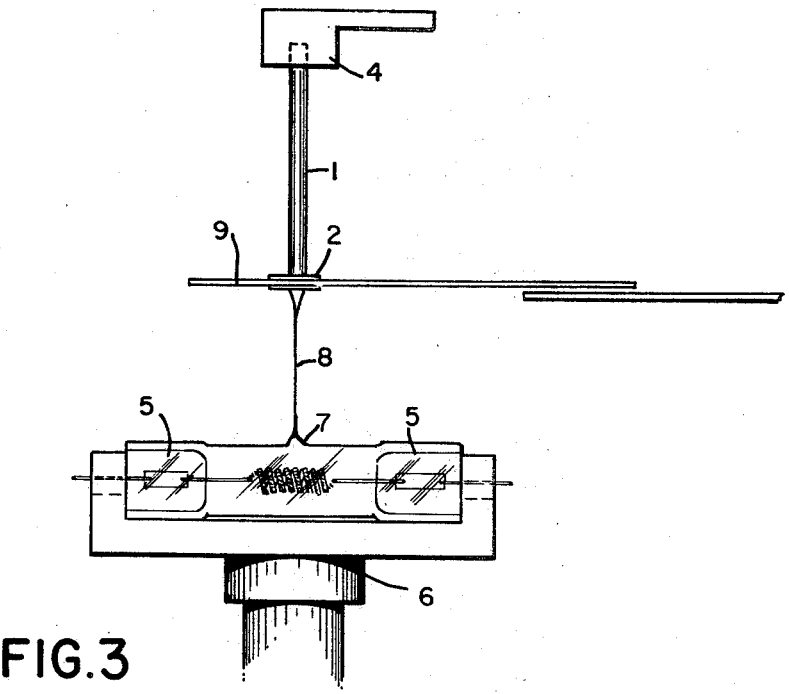
FIGURE 3 is an elevational view of the lamp during the sealing operation.
Figure 4:
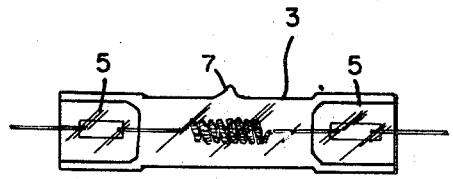
FIGURE 4 is an elevational view of the finished lamp.

The end of exhaust tube 1 is attached to a sealing machine head 4 through which the lamp is exhausted, flushed with an inert gas, reexhausted, and pressure-filled. End seals 5 of the lamp are clamped to a vertically movable support 6 which is attached to the piston of an air cylinder (not shown). A tension spring (not shown) is also attached to the air cylinder piston and support 6 can be raised by applying enough air pressure to the cylinder to overcome the force of the tension spring. When the pressure is released, the tension spring lowers support 6. During the exhausting, filling and sealing steps, air pressure is applied to the cylinder to maintain a constant upward force on the lamp. After the lamp is filled, carbon ring 2 is inductively heated by transfer coil 9 until the encircled portion of exhaust tube 1 softens. Under the action of the applied force, the softened portion is compressed and flows, substantially radially, until the interior of carbon ring 2 is filled and exhaust tube 1 is sealed. Since the softened portion of the exhaust tube is entirely confined within carbon ring 2, the fill pressure, if about one atmosphere or higher, cannot bulge any portion of the lamp or exhaust tube. Immediately after exhaust tube 1 is sealed and while the vitreous material is still softened, the pressure in the air cylinder is released and the lamp is slowly withdrawn from exhaust tube 1 by the action of the tension spring. As shown in FIGURE 3 the vitreous material is stretched to form thread 8 between the lamp and the exhaust tube, and conical fused tip 7 seals the lamp. The susceptor 2 generally remains on the separated residue of exhaust tube 1. After cooling, vitreous thread 8 is broken off near fused tip 7 which is flame polished to eliminate sharp edges.

Induction heating is preferred to the usual glass working fires in this invention because it can be confined to a small area while uniformly heating the portion of the exhaust tube encircled by the susceptor. The susceptor can be made of any electrically conductive material that can withstand a temperature of about 2000° centigrade and will not contaminate the lamp. It is heated by an alternating electromagnetic field which induces alternating current in the susceptor. The electromagnetic field is generated by a high frequency oscillator and its energy is transmitted to the susceptor by an induction coil surrounding it or in close proximity. A transfer coil including a single conducting turn or closed loop may also be used to transfer the electromagnetic energy from the induction coil to the susceptor. One end of the transfer coil is placed in close proximity to the induction coil and the opposite end surrounds the susceptor.

In the instant invention, the induction coil had a flat pancake shape and was made of 5 turns of insulated ³⁄₁₆ inch diameter copper tubing wound around each other to a coil diameter that was 1½ inches inside and 3½ inches outside. The transfer coil was made of 1/8 inch thick copper and was 4¾ inches long. One end was circular with a 3¼-inch diameter and the opposite end was rectangular, 2 inches wide. At their respective centers were circular openings of 1¼ inches and 5/16 inch diameter. A slot 0.015″ wide connected the two openings. Thus the perimeter of the transfer coil constituted a closed loop.

In operation, the transfer coil was parallel to and 1/32 inch apart from the induction coil. The circular end of the transfer coil was coaxial with the induction coil and the susceptor was disposed within the opening in the rectangular end. Water cooling prevented the induction coil from overheating.

In a specific example for a 650 watt T4 lamp, the lamp envelope and exhaust tube were made of high silica glass. Exhaust tube 1 had an outside diameter of 0.150 inch and was 2¼ inches long. Carbon ring 2 had an inside diameter of 0.156 inch, an outside diameter of ¼ inch, a length of ¼ inch and was disposed around exhaust tube 1 adjacent to envelope 3. Exhaust tube 1 was inserted into sealing machine head 4, and end seals 5 were clamped to support 6. Forty pounds per square inch of pressure was applied to the air cylinder resulting in an upward vertical force of about 15 pounds on the lamp. The lamp was then exhausted to about 5 microns, and flushed with nitrogen several times. After lamp out-gassing and filament light-up, a fill gas of nitrogen and iodine at one atmosphere pressure was introduced into the lamp. Carbon ring 2, acting as a susceptor, was inductively heated by means of transfer coil 9 until in a few seconds the enclosed portion of exhaust tube 1 was softened and compressed by the upward vertical force, sealing the exhaust tube. The pressure in the air cylinder was immediately released and, while the inductive heat on carbon ring 2 was maintained, the tension spring withdrew the lamp away from exhaust tube 1, drawing the softened portion to a thread 8 with conical shaped fused tip 7 sealing the lamp. Thread 8 was physically broken off and fused tip 7 fire polished to smooth the sharp edge.

This invention was also satisfactorily used in sealing a similar lamp at a fill pressure of 4½ atmospheres, by increasing the pressure in the air cylinder to exert a greater force on the lamp during the sealing operation. Although lamps have been manufactured according to this invention at fill pressures of one to four and one-half atmospheres, the maximum fill pressure is limited only to that imposed by the strength of the lamp envelope. The carbon ring can be reinforced by a metal band around it, if necessary, to enable it to withstand higher internal pressures.

As my invention, I claim:
1. The manufacture of an incandescent lamp having a fill, the steps which comprise:
   disposing a ring around the vitreous exhaust tube of a lamp envelope, adjacent to said lamp envelope;
   heating said ring until the encircled portion of said exhaust tube becomes softened;
   compressing said softened portion until said exhaust tube is sealed within said ring, whereby said lamp is sealed.
2. The process according to claim 1, wherein the fill pressure of said lamp is at least about one atmosphere.
3. The process according to claim 1, wherein said ring is made of carbon.
4. The process according to claim 1, wherein said heating is inductive.
5. The process according to claim 1, wherein said lamp envelope and said exhaust tube are made of high silica glass.
6. The manufacture of an incandescent lamp having a fill of at least one atmosphere, the steps which comprise:
   disposing a susceptor around the vitreous exhaust tube of a lamp envelope, adjacent to said envelope;
   inductively heating said susceptor whereby the encircled portion of said tube is softened;
   compressing said exhaust tube and said lamp envelope together whereby said softened portion of said tube joins together and seals said envelope within said ring.
7. The process according to claim 6 wherein said lamp envelope is drawn apart from said exhaust tube after said envelope is sealed and while said encircled portion of said exhaust tube is still softened.
8. The process according to claim 7 wherein said susceptor is made of carbon.
9. The process according to claim 8 wherein said envelope and exhaust tube are made of high silica glass.
10. The process according to claim 9 wherein said fill comprises iodine and an inert gas.

References Cited

UNITED STATES PATENTS 2,359,500 10/1944 White.
2,359,501 10/1944 White.
3,305,289 2/1967 Fridrich _____ 65—34

S. LEON BASHORE, Primary Examiner

E. R. FREEDMAN, Assistant Examiner

U.S. Cl. X.R.

65—36, 54, 103, 155, 270